United States Patent [19]

Nakano et al.

[11] Patent Number: 4,816,656
[45] Date of Patent: Mar. 28, 1989

[54] IC CARD SYSTEM

[75] Inventors: Harumi Nakano; Kazutomo Tani, both of Tokyo, Japan

[73] Assignee: Casio Computer Co., Ltd., Tokyo, Japan

[21] Appl. No.: 207,021

[22] Filed: Jun. 14, 1988

Related U.S. Application Data

[63] Continuation of Ser. No. 947,098, Dec. 29, 1986, abandoned.

[30] Foreign Application Priority Data

Jan. 14, 1986 [JP] Japan .................................. 61-5722

[51] Int. Cl.⁴ .............................................. G06K 5/00
[52] U.S. Cl. ...................................... 235/380; 235/492
[58] Field of Search ................................ 235/380, 492

[56] References Cited

U.S. PATENT DOCUMENTS 4,105,156  8/1978  Dethloff .
4,582,985  4/1986  Lofberg .............................. 235/380

Primary Examiner—Harold Pitts
Attorney, Agent, or Firm—Frishauf, Holtz, Goodman & Woodward

[57] ABSTRACT

An IC card system uses at least one of the RESET, I/O, and CLOCK terminals of an IC card so as to serially and/or parallel input multivalue signals having different levels. The levels of the input signals are detected at a detector or detectors and outputs therefrom are compared at a comparator with specific codes prestored in level matrix of the IC card. If a coincidence between outputs obtained corresponding to the input signals and the specific codes is established, a test program stored in a test program ROM is started.

16 Claims, 19 Drawing Sheets

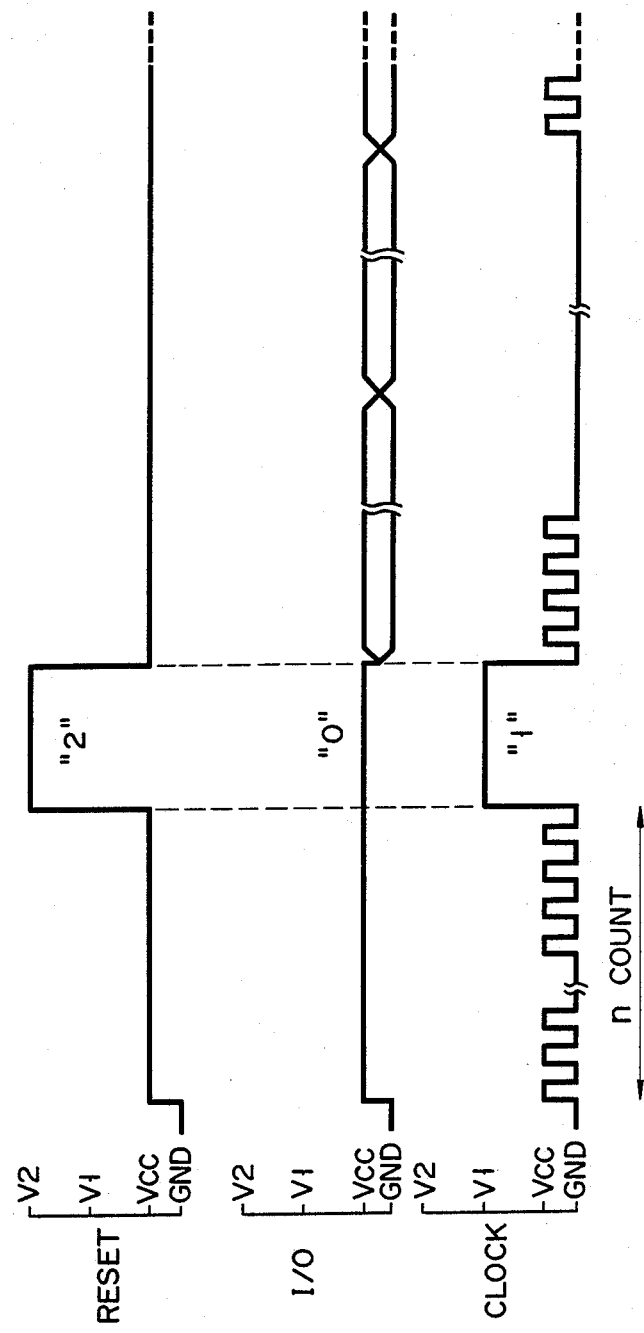

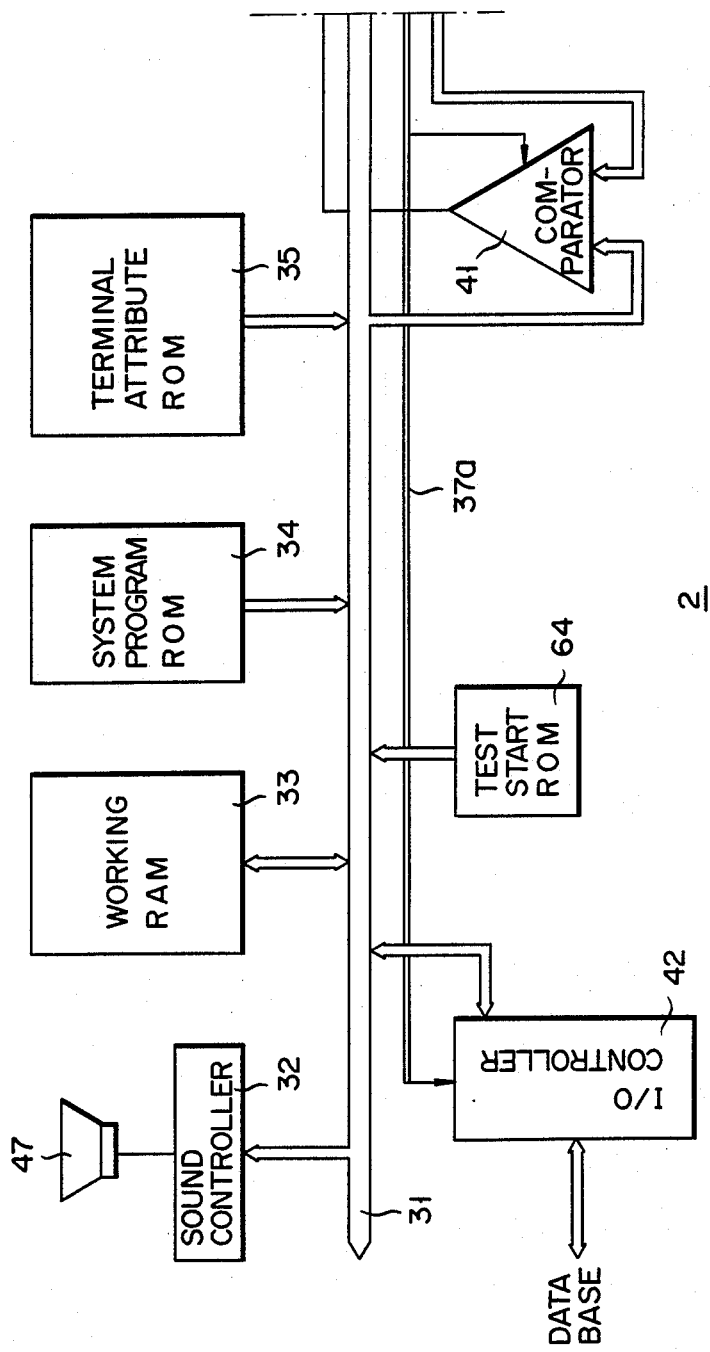

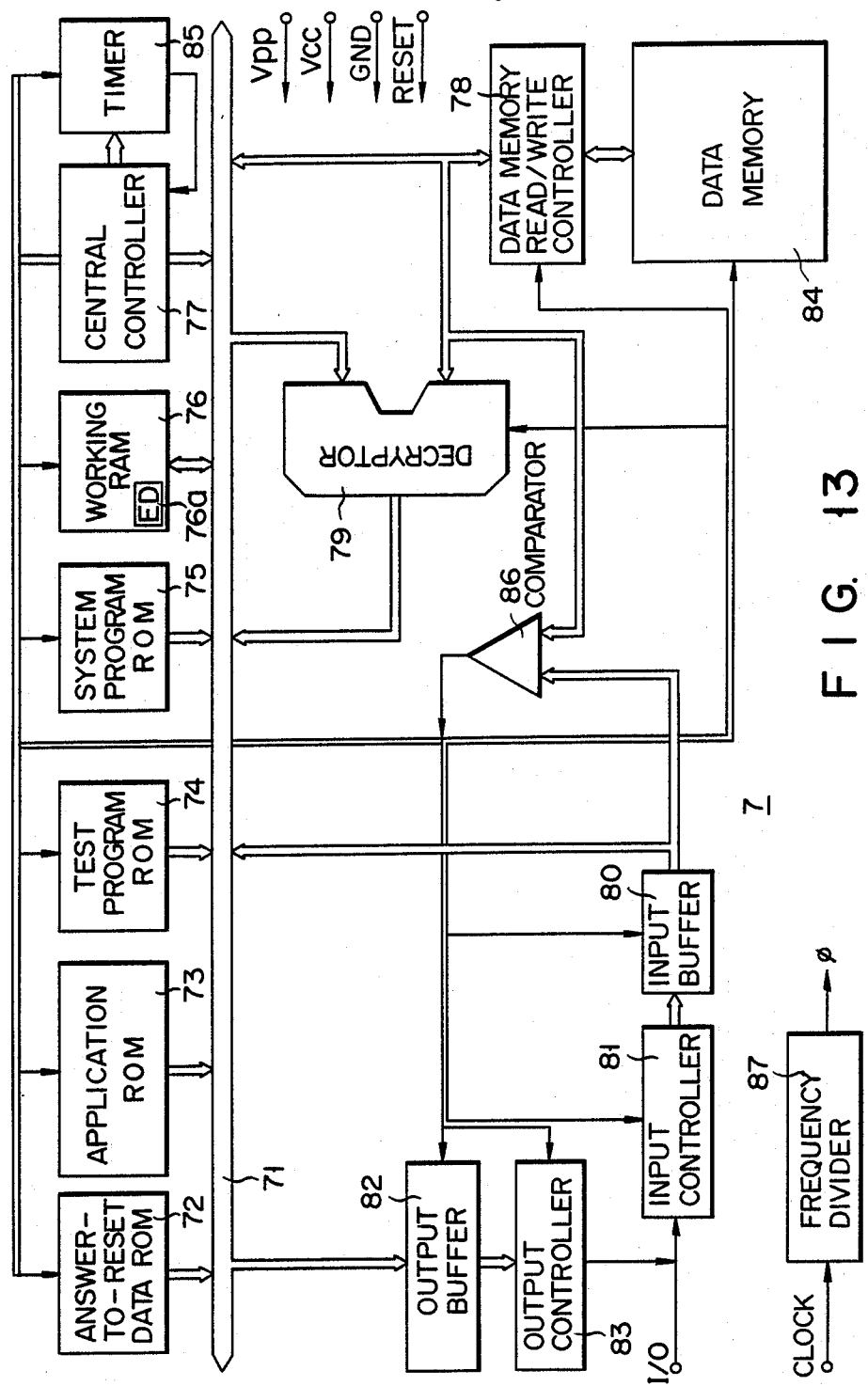
F I G. 13

IC CARD SYSTEM

This application is a continuation of application Ser. No. 947,098, filed Dec. 29, 1986, now abandoned.

BACKGROUND OF THE INVENTION

The present invention relates to an IC card system wherein security in regard to confidentiality of data stored in an IC card can be improved when a test program stored in an IC circuit in the card is started.

Our contemporary age is called a "cashless" age, and customers frequently use credit cards issued by credit companies to purchase desired items without cash transactions.

Conventional cards of this type are a plastic card, an embossed card, and a magnetic stripe card. These cards can be easily counterfeited due to their structural problems, and illegal use of these cards has become an issue.

An information card incorporating an IC circuit for storing an identification number or the like therein, that is, an IC card is proposed to solve the above problems.

Various types of LSIs such as a data memory and a system program ROM are incorporated in such an IC card. In this case, addressing and read/write access of the data memory and the bit pattern status of the system program ROM must be controlled to be normal. For this purpose, IC cards must be tested to check their states at the end of assembly of the cards and during use thereof.

In a conventional IC card, a test program is stored in an IC chip and a predetermined test can be executed externally through test terminals on the card.

However, simple external testing through the test terminals also indicates easy extraction of confidential information such as bit patterns of the system program ROM and the data memory. This means that a card can be counterfeited on the basis of the extracted information, and that, in the worst case, techniques in a system using IC cards may be analyzed and illegally used in a large scale.

Even if a test program in the IC card is legally initialized and executed, errors in LSIs during various tests are detected as card errors. In this sense, it is difficult to specify the error location, and a proper countermeasure cannot be taken against this error. As a result, even if a simple error occurs, the entire IC card must be discarded.

SUMMARY OF THE INVENTION

The present invention has been made in consideration of the above situation, and has as its object to provide an IC card system which can prevent illegal initialization of a test program in an IC card and extraction of confidential information from the IC card during a test, and which allows detection of a test error location to immediately eliminate the error.

According to the invention, there is provided an IC card system comprising:

IC card means, incorporating at least one integrated circuit, for exchanging signals with an external device through a plurality of terminals, the integrated circuit including test program storing means for storing a test program for performing a test of the integrated circuit, and checking means for checking truth/false of a test start signal sent from the external device and for executing a test program according to a test result; and terminal means adapted to receive the IC card means therein to perform the test of the integrated circuit in the IC card means, the terminal means comprising test starting means for sending the test start signal to the IC card means.

BRIEF DESCRIPTION OF THE DRAWINGS

FIG. 3 is a timing chart of a three-value signal used in the IC card of FIG. 1;

FIGS. 4A and 4B show, in combination, a block diagram of a test terminal for the IC card in FIG. 1;

FIG. 13 is a block diagram of an IC card according to a fourth embodiment of the present invention;

DETAILED DESCRIPTION OF THE PREFERRED EMBODIMENTS

A first embodiment of the present invention will be described with reference to the accompanying drawings below.

Figure 1:
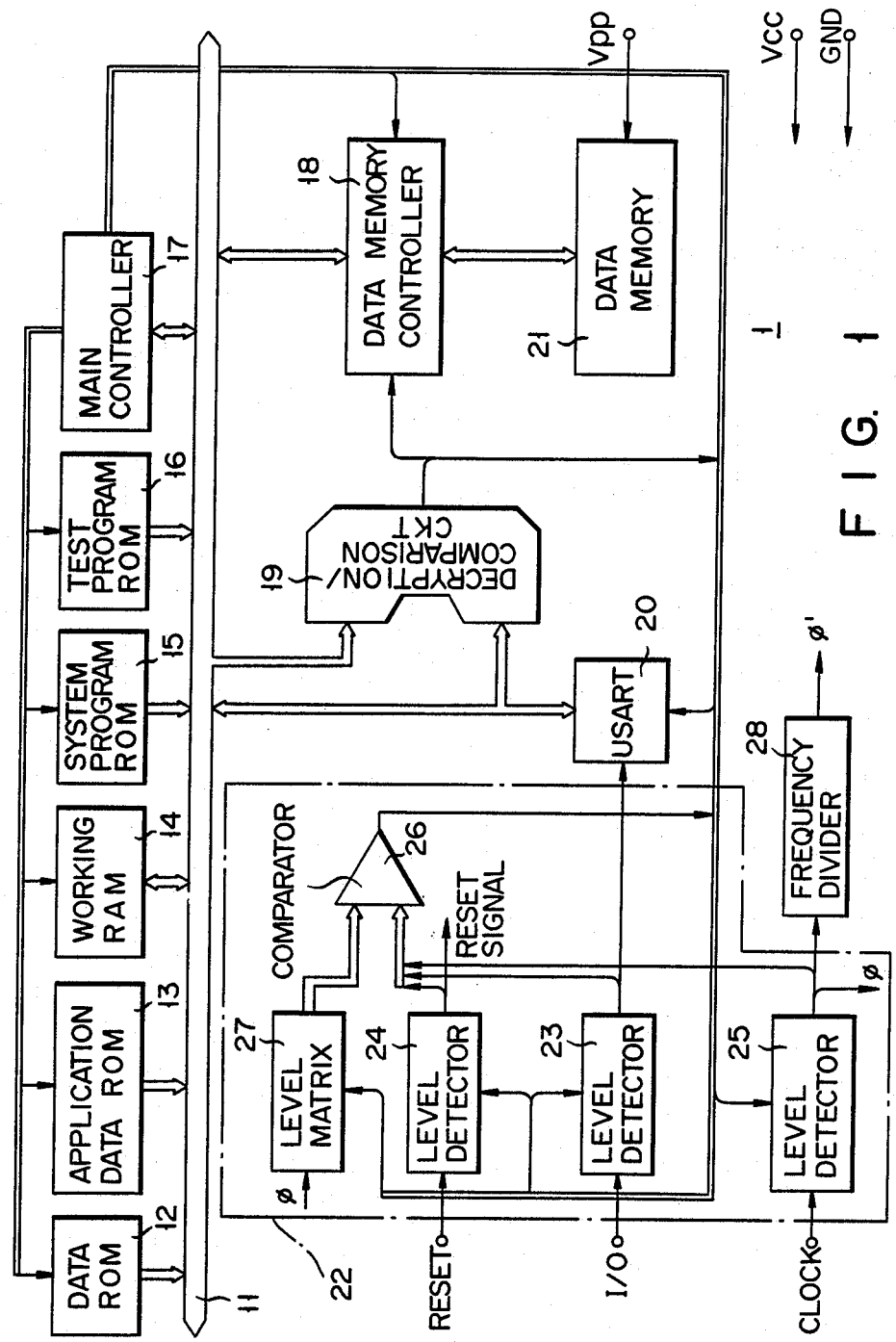
FIG. 1 is a block diagram of an IC card according to a first embodiment of the present invention.

FIG. 1 shows a circuit arrangement of IC card 1 of this embodiment. Reference numeral 11 denotes a system bus connected to data ROM 12, application data ROM 13, working RAM 14, system program ROM 15, test program ROM 16, main controller 17, data memory controller 18, decryption/comparison circuit 19, and USART (Universal Synchronous Asynchronous Receiver Transmitter) circuit 20.

Data ROM 12 stores all operating conditions for IC card 1. The conditional data is sent as answer-to-reset data to test terminal 2 and anomal transaction terminal when internal initialization of the card itself is completed. The answer-to-reset data is produced according to a predetermined format.

Application data ROM 13 stores card type data "APN" representing the type of card. This data is sent in a predetermined data format to a terminal when attributes are to be exchanged between the terminal and the IC card after initial parameters are set on the basis of the answer-to-reset data.

Working RAM 14 stores arithmetic data in IC card 1.

System program ROM 15 prestores code signal "ACK" and "NAC" representing whether a signal sent together with various system programs from terminal 2 is correct. System program ROM 15 also stores a specific code for finally checking a test program initialization or start instruction from terminal 2.

Test program ROM 16 stores a test program for checking a bit pattern in system program ROM 15 or executing access of data memory 21.

Main controller 17 outputs an operation instruction to the respective circuits according to a data signal sent from terminal 2 and the operating states.

Data memory controller 18 controls addressing and read/write access of data memory 21 in response to an instruction from main controller 17, and also inhibits such addressing and read/write access.

Data memory 21 comprises, for example, an EEPROM (Electrically Erasable Programmable Read-Only Memory). In this case, data memory 21 stores codes "CA" (Card Authenticator), "IPIN" (Initialization Personal Identification Number), "PAN" (Primary Account Number), "CHN" (Card Holder's Name), "EPD" (Expiration Date) and "PRK" (Private Key) as well as status data "ST". Code "CA" is a random code and used to encrypt or decrypt a message. Code "IPIN" is a 6-bit random code and represents a number until holder's own number "PIN" is used. Code "PAN" represents a bank account number. Code "CHN" represents the name of a card holder. Code "EPD" represents an expiration date of the card. Code "PRK" is a decryption code. Code "ST" represents the current card status and is sent to terminal 2 in a data format.

Decryption/comparison circuit 19 decrypts input data sent from terminal 2 on the basis of an "RSA" algorithm and compares the decypted code with a specific code read out from system program ROM 15 as needed. An output from circuit 19 is sent to main controller 17.

USART circuit 20 controls data transmission between the IC card and terminal 2.

Reference numeral 22 denotes a check circuit for checking whether a test program can be started. Check circuit 22 includes the I/O terminal for exchanging data with terminal 2 while card 1 is loaded in terminal 2, the RESET terminal for receiving a reset signal, and the CLOCK terminal for receiving a clock signal. The I/O, RESET, and CLOCK terminals are respectively connected to level detectors 23, 24, and 25. The I/O, RESET, and CLOCK terminals are connected to a normal transaction terminal to receive normal signals and also connected to test terminal 2 to receive a multivalue signal having different levels during a test. More specifically, as shown in FIG. 3, the multivalue signal represents three different voltages Vcc, V1, and V2. In the normal combination, voltage Vcc is applied to the I/O terminal, voltage V1 is applied to the CLOCK terminal, and voltage V2 is applied to the RESET terminal. In this state, level detector 23 generates level "0"; detector 24, level "2"; and detector 25, level "1".

Outputs from level detectors 23, 24, and 25 are supplied to comparator 26. Comparator 26 also receives an output from level matrix 27. Matrix 27 has a combination of parallel level information assigned to the card in correspondence with a combination of parallel level information from detectors 23, 24, and 25. In this case, matrix 27 receives clock signal $\phi$.

A comparison result from comparator 26 is supplied to main controller 17.

In the case of inputting or outputting ordinary data other than the multivalue signals for testing from the I/O terminal, this can be done via an input controller, an input buffer, an output controller and an output buffer (not shown).

Figure 2:
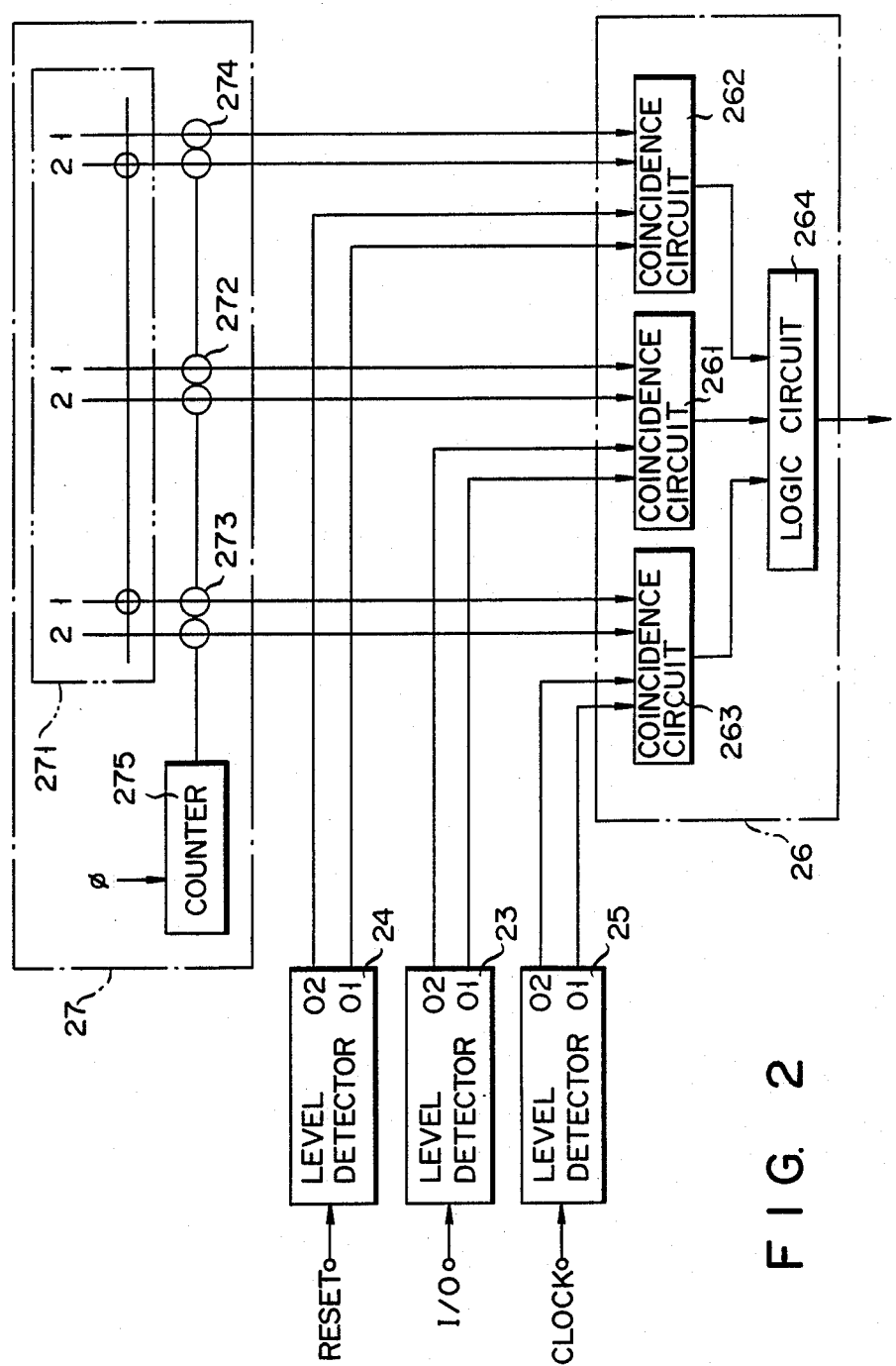
FIG. 2 is a detailed block diagram of a check circuit in the IC card of FIG. 1.

Check circuit 22 will be described in detail with reference to FIG. 2. Each of level detectors 23, 24, and 25 has terminals 01 and 02 and outputs data "00" for level "0", data "01" for level "1", and data "10" for level "2". Comparator 26 receiving the outputs from level matrix 27 comprises three coincidence circuits 261, 262, and 263 respectively receiving the outputs from detectors 23, 24, and 25, and logic circuit 264 outputting a "1" output upon reception of coincidence outputs from all of coincidence circuits 261, 262, and 263.

Matrix 27 comprises ROM 271 for storing three kinds of data, i.e., "00", "01", and "10" as the parallel level information assigned to each card. Data "00" is supplied to coincidence circuit 261 through transfer gate 272, data "01" is supplied to coincidence circuit 263 through transfer gate 273, and data "10" is supplied to coincidence circuit 262 through transfer gate 274. Transfer gates 272, 273, and 274 are enabled in response to an output from counter 275. Counter 275 counts clock signal $\phi$ and generates an output when its count reaches predetermined value n.

Referring back to FIG. 1, a card drive voltage is applied from terminal 2 to the Vcc terminal, and a write voltage for data memory 21 is applied to the Vpp terminal. At this time, the power source voltage is set by terminal 2 on the basis of the answer-to-reset data stored in ROM 12. A GND (ground) line of terminal 2 is connected to the GND terminal. A card operation signal is supplied as a clock signal $\phi'$ through frequency divider 28.

Figure 4B:
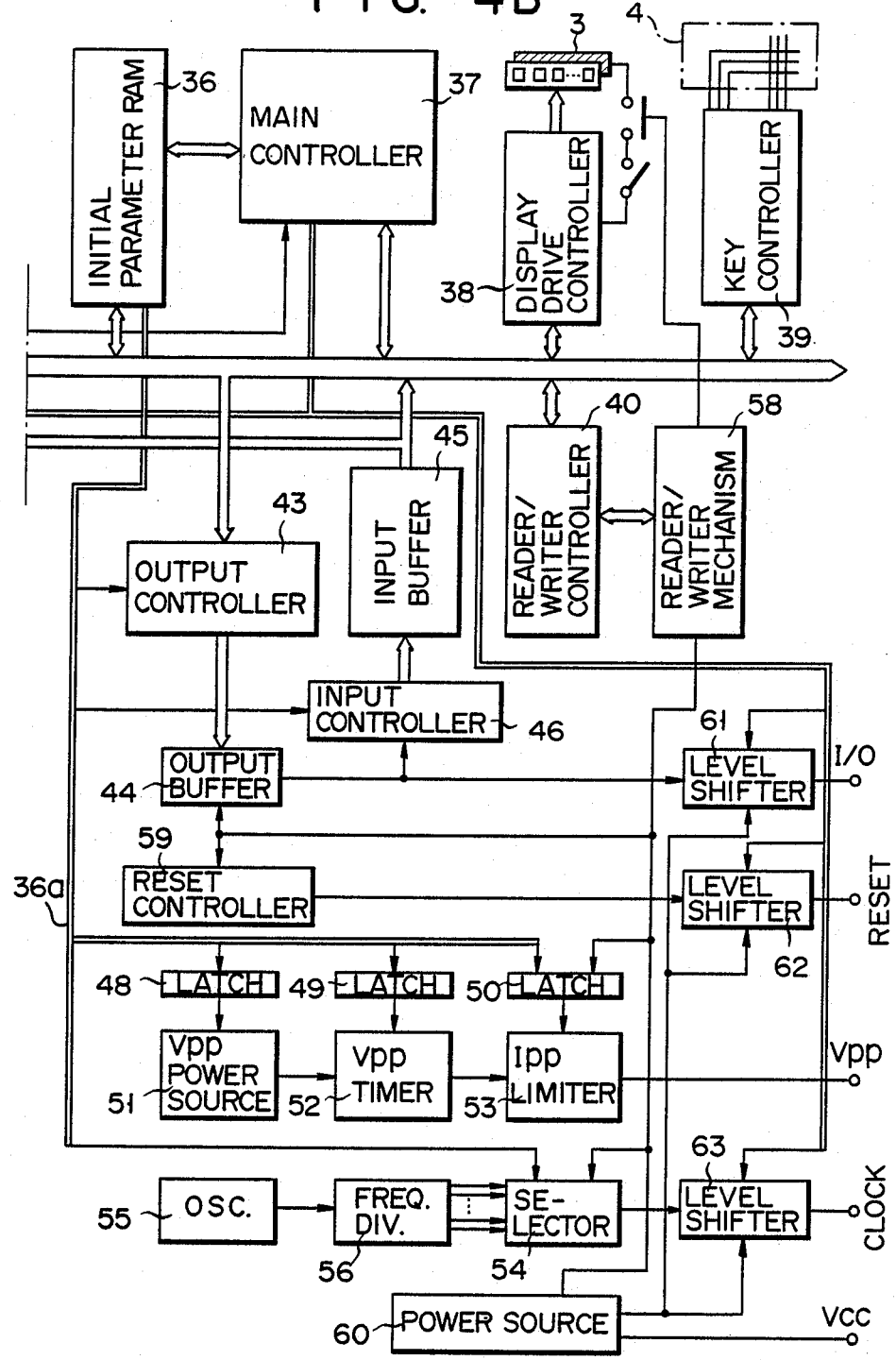

The circuit arrangement of test terminal 2 for receiving IC card 1 therein is shown in FIG. 4. Referring to FIG. 4, reference numeral 31 denotes a system bus connected to sound controller 32, working RAM 33, system program ROM 34, terminal attribute ROM 35, initial parameter RAM 36, main controller 37, display drive controller 38, key controller 39, reader/writer controller 40, comparator 41, I/O controller 42, output buffer 44 through output controller 43, and input controller 46 through input buffer 45.

Loudspeaker 47 is connected to sound controller 32 to produce an alarm sound as needed.

Working RAM 33 stores codes "PAN", "CHN", and "EPD" in addition to error data "ED" sent from IC card 1. RAM 33 also stores various processed data in terminal 2.

System program ROM 34 stores various system programs and the ENQ code for causing terminal 2 to match with IC card 1.

Terminal attribute ROM 35 stores terminal code TC (e.g., manufacture's code, issuer's code, or store's code) according to the application of the card.

Initial parameter RAM 36 simultaneously stores answer-to-reset data from card 1. RAM 36 is connected to output controller 43, input controller 46, Vpp level latch 48, Vpp timer latch 49, and Ipp level latch 50 through transmission line 36a. Vpp power source 51, Vpp timer 52, and Ipp limiter 53 are connected to latches 48, 49, and 50, respectively.

Vpp power source 51 is arranged to guarantee voltage Vpp used for writing data in data memory 21 in IC card 1. Vpp timer 52 is arranged to guarantee a maximum Vpp voltage application time designated by IC card 1. Ipp limiter 53 is arranged to determine an allowable maximum value of a data write current.

The maximum data write voltage from Vpp power surce 51, the Vpp application time set by Vpp timer 52, and the allowable maximum data write current limited by Ipp limiter 53 are determined on the basis of the answer-to-reset data stored in initial parameter RAM 36.

IC card operating frequency selector 54 is connected to data transmission line 36a. Selector 54 receives an oscillation signal from oscillator 55 through frequency divider 56, and the resultant signal is output as a signal having a predetermined operating frequency from the CLOCK terminal.

Comparator 41 and I/O controller 42 are connected to system control line 37a of main controller 37. A control instruction is sent from controller 37 to the respective circuits 41 and 42.

Display drive controller 38 controls display unit 3 in terminal 2.

Key controller 39 supplies a key sampling signal to keyboard 4 in terminal 2 to detect a key input signal.

Reader/writer controller 40 controls and drives reader/writer mechanism 58. Mechanism 58 comprises a card transport motor to transport IC card 1 from a card inlet slot to a predetermined position, and electrically connects the card to terminal 2. When predetermined processing is completed, card 1 is returned to the card inlet slot.

Reader/writer mechanism 58 is connected to output buffer 44, reset controller 59, Ipp level latch 50, operating frequency selector 54, and power source 60. Terminal 2 has the I/O, RESET, Vpp, CLOCK, and Vcc terminals connected to card 1 and respectively corresponding to buffer 44, controller 59, latch 50, selector 54, and power source 60.

Input controller 46 and output controller 43 control data exchange with IC card 1 in response to an instruction supplied from main controller 37 through initial parameter RAM 36. Input controller 46 sends data from card 1 to working RAM 33 and comparator 41 through input buffer 45. A comparison output is supplied to controller 37. Output controller 43 supplies data from terminal attribute ROM 35 or the like to card 1 through buffer 44.

I/O controller 42 interfaces encrypted data when a data base, i.e., a host computer is on-line connected.

Power source 60 outputs a voltage Vcc to the Vcc terminal and is connected to level shifters 61, 62, and 63 to output voltages GND, V1, and V2. Shifters 61, 62, and 63 output a multivalue signal for starting the test program in FIG. 3. At the test start time, voltage levels of GND, Vcc, V1, and V2 outputs from power source 60 are selected, as shown in FIG. 3, on the basis of the data stored in test start ROM 64. At a timing excluding the test start time, shifter 61 electrically connects buffer 44 and the I/O terminal, shifter 62 electrically connects controller 59 and the RESET terminal, and shifter 63 electrically connects selector 54 and the CLOCK terminal.

The relationship between IC card 1 and terminal 2 for receiving card 1 will be briefly described below. When card 1 is loaded in terminal 2, an initial setting signal preset by terminal 2 is sent to card 1. The IC card 1 is operated under the operating conditions represented by this signal. More specifically, the answer-to-reset data stored in data ROM 12 is read out under the control of main controller 17 and is sent to terminal 2. If terminal 2 determines that the request data is a legal one, card operating conditions are set, and at the same time an "ENQ" (Enquiry) code is sent back. This code is written in working RAM 14. In this state, main controller 17 determines whether the "ENQ" code is normally received. If YES, the "ACK" code is read out from system program ROM 15 and sent to terminal 2. However, if NO, the "NAC" code is read out from ROM 15 and sent to terminal 2. When terminal 2 detects the "ACK" signal, terminal code "TC" is sent back from terminal 2. The "TC" codes are different according to the types of terminals. However, if terminal 2 detects the "NAC" signal, communication between IC card 1 and terminal 2 is interrupted. When the "TC" code is sent from terminal 2 to card 1, card 1 reads out the "APN" code from application data ROM 13 under the control of main controller 17 according to the type of card. The readout "APN" code is sent to terminal 2. Thereafter, terminal 2 determines on the basis of the "APN" code whether the required application coincides with the application represented by the "APN" code. If no coincidence is established, IC card 1 is disconnected from terminal 2. When an instruction code is generated in this manner, personal identification number "PIN" is compared with that stored in the IC card. When the input "PIN" coincides with the preset ID (identification) number, exchange of information such as a business transaction is performed between the IC card and terminal 5.

Figure 5:
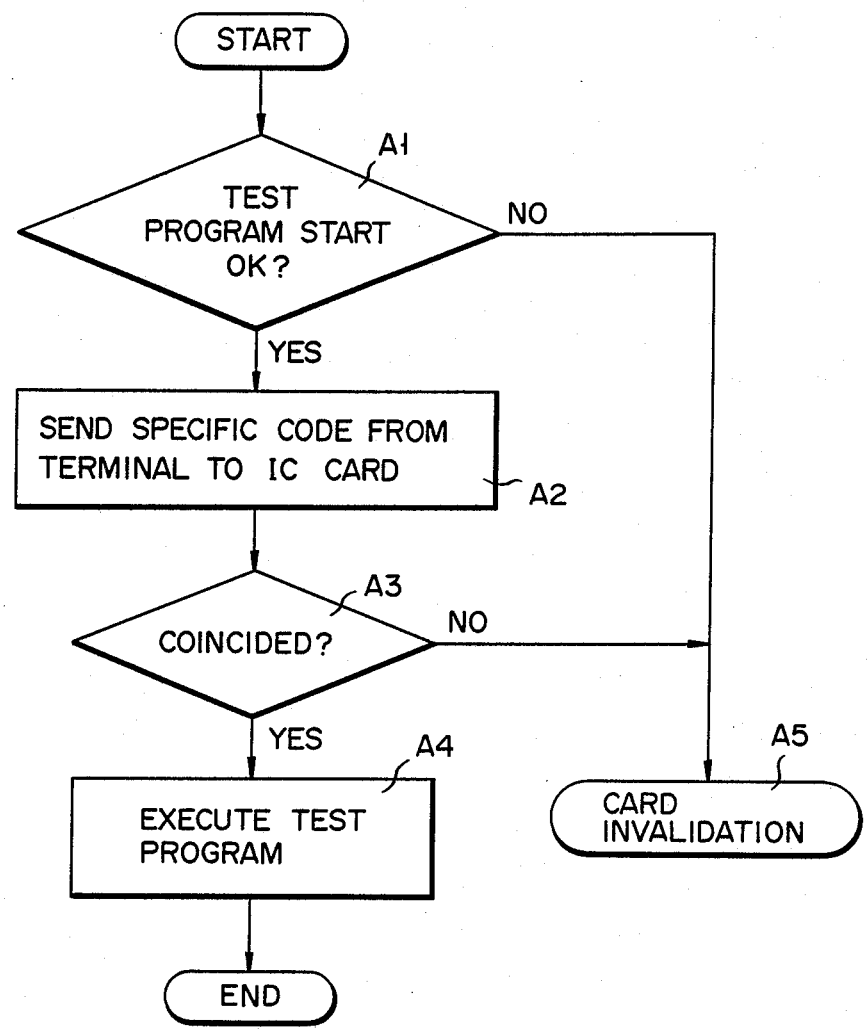
FIG. 5 is a flow chart for explaining the operation of the test terminal in FIG. 4.

The embodiment having the arrangement described above will be described with reference to a flow chart in FIG. 5.

A user inserts IC card 1 into test terminal 2 to test the card. The I/O, RESET, CLOCK, Vcc, Vpp, and GND terminals of card 1 are connected to the corresponding terminals in terminal 2.

Upon completion of such procedures, the operation in step A1 is executed. In step A1, main controller 37 determines whether a legal test program starting request is generated. Multilevel signals having different values are sent from terminal 2 to the I/O, RESET, and CLOCK terminals of IC card 1. More specifically, when a test instruction is generated by terminal 2, three voltages Vcc, V1, and V2 having different levels are simultaneously output when n clock pulses are counted, as shown in FIG. 3. In this case, voltage V2 is applied to the RESET terminal; Vcc, to the I/O terminal; and V1, to the CLOCK terminal. Bit data "00", i.e., level information "0" appears at output terminals 01 and 02 of level detector 23. Bit data "10", i.e., level information "2" appears at output terminals 01 and 02 of level detector 24. Similarly, bit data "01", i.e., level information "1" appears at output terminals 01 and 02 of level detector 24. These pieces of level information are supplied to coincidence circuits 261, 262, and 263 in comparator 26, respectively. More specifically, the output from level detector 23 is supplied to coincidence circuit 261; the output from detector 24, to coincidence circuit 262; and the output from detector 25, to coincidence circuit 263.

In level matrix 27, counter 275 counts pulses of clock signal φ from terminal 2. When the count of counter 275 reaches n, counter 275 generates an output at the same timing when the multivalue signal is sent to IC card 1. Transfer gates 272, 273, and 274 are simultaneously enabled, and data "00", data "01", and data "10" stored in ROM 271 are supplied as level information to coincidence circuits 261, 262, and 263 in comparator 26. In this case, data "00" is sent to coincidence circuit 261;

"01", to coincidence circuit 263; and "10", to coincidence circuit 262.

Coincidence circuits 261, 262, and 263 check coincidences between the pieces of level information from level detectors 23, 24, and 25 and the corresponding pieces of information from level matrix 27. In this case, when coincidences in all coincidence circuits 261, 262, and 263 are established, logic circuit 264 generates a logic "1" output. However, if an illegal program starting request is made and a combination of three-value signal values from terminal 2 is wrong, at least one of coincidence circuits 261, 262, and 263 does not generate a coincidence signal, and logic circuit 264 is kept disabled. In this case, logic circuit 264 is constituted of an AND circuit and the coincidence signal is "1".

In this state, the output from logic circuit 264 is sent to main controller 17.

In this case, if the three-value signal in FIG. 3 is input to the respective terminals, all coincidence circuits 261, 262, and 263 generate coincidence signals, and logic circuit 264 outputs a logic "1" signal. In this case, main controller 17 determines that the legal program starting request is generated. The flow then advances to step A2.

In step A2, main controller 17 sends to terminal 2 an instruction representing that a legal program starting request is sent to terminal 2. In this state, terminal 2 sends a specific code for program start. The specific code is received by decryption/comparison circuit 19.

The specific code written in system program ROM 15 is read out in response to an instruction from main controller 17 and is sent to decryption/comparison circuit 19. In step A3, the specific code from terminal 2 is compared with the preset specific code in the card 1. If a comparison result of decryption/comparison circuit 19 represents a noncoincidence, the flow advances to step A5, and card invalidation processing is performed. Card invalidation inhibits addressing and data read/write access of data memory 21 under the control of data memory controller 18 in response to the instruction from main controller 17. If a coincidence is established, the flow advances to step A4, and the contents of test program ROM 16 are read out. The bit pattern in system program ROM 15 or the data memory 21 in the card 1 can be checked by terminal 2.

However, if the combination of the three-value signal values from terminal 2 is wrong due to an illegal program starting request, at least one of coincidence circuits 261 to 263 generates a noncoincidence signal, and thus logic circuit 264 is kept disabled. Controller 17 determines that the request is an illegal one. In this case, the flow advances to step A5. In the same manner as described above, addressing and data read/write access of memory 21 under the control of controller 18 are inhibited, and the card 1 is processed as an invalid card.

The RESET, I/O, and CLOCK terminals of IC card 1 are utilized and receive the three-value signal from terminal 2. Only if the combination of parallel level information pieces based on the three-value signal coincides with the combination of parallel level information pieces prestored in the IC card 1, the test program in the card 1 is started or initialized. As compared with the conventional arrangement wherein a test can be externally performed by using a test terminal, the test program cannot be illegally started, and thus an attempt for extracting highly confidential information can be prevented. Technical analysis of the overall system, let alone counterfeit of the card, can be properly prevented to greatly improve the security level of the card.

In the first embodiment, three terminals of IC card 1 such as Reset terminal, I/O terminal and CLODK terminal are utilized, and a three-value signal is supplied thereto, thereby starting the test program. However, a multivalue signal having a plurality of levels may be serially input to one input terminal of IC card 1 to start the test program.

A second embodiment of the present invention will be described below.

In this embodiment, the RESET terminal is utilized to request the start of the test program.

Figure 6:
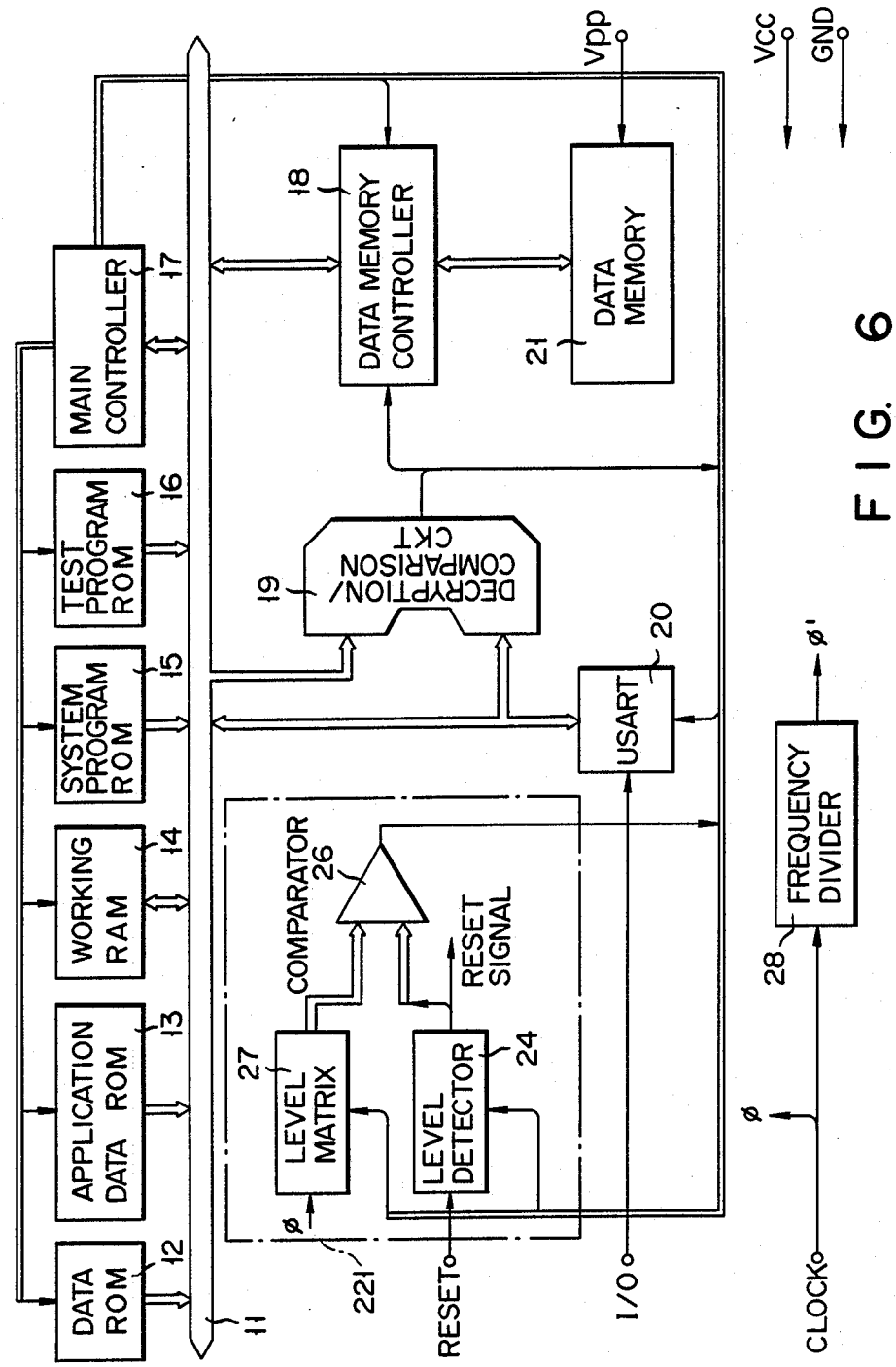
FIG. 6 is a block diagram of an IC card according to a second embodiment of the present invention.

FIG. 6 shows a circuit arrangement of this embodiment. The same reference numerals as in the first embodiment denote the same parts in the embodiment of FIG. 6, and a detailed description thereof will be omitted.

USART circuit 20 is directly connected to terminal 2 at the I/O terminal thereof to control data transmission with the terminal 12.

Figure 8:
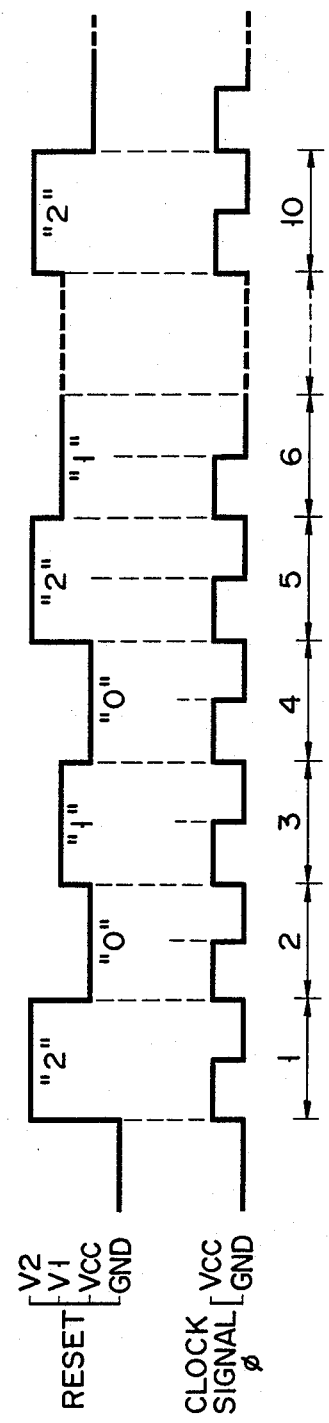
FIG. 8 is a timing chart for explaining a three-value signal used in the IC card of FIG. 6.

Reference numeral 221 denotes a check circuit for checking whether the legal test program starting request is generated. Check circuit 221 has the RESET terminal for receiving a reset signal, while card 1 is loaded in terminal 2. Level detector 24 is connected to this RESET terminal. In this case, in addition to the RESET signal, a plurality of multivalue signals having different levels are serially supplied to the RESET terminal in synchronism with clock signal $\phi$ supplied to the CLOCK terminal. More specifically, as shown in FIG. 8, multivalue signals having different levels represent voltages Vcc, V1 and V2, respectively. These three-value signals are supplied to the RESET terminal in a predetermined order in synchronism with clock signal $\phi$. In this state, detector 24 generates level information "0" for Vcc, "1" for V1, and "2" for V2.

The output from level detector 24 is supplied to comparator 26. Comparator 26 also receives an output from level matrix 27. Matrix 27 stores level information inherent to each card so as to correspond to level information from detector 24. Matrix 27 receives clock signal $\phi$.

The comparison result from comparator 26 is sent to main controller 17.

Figure 7:
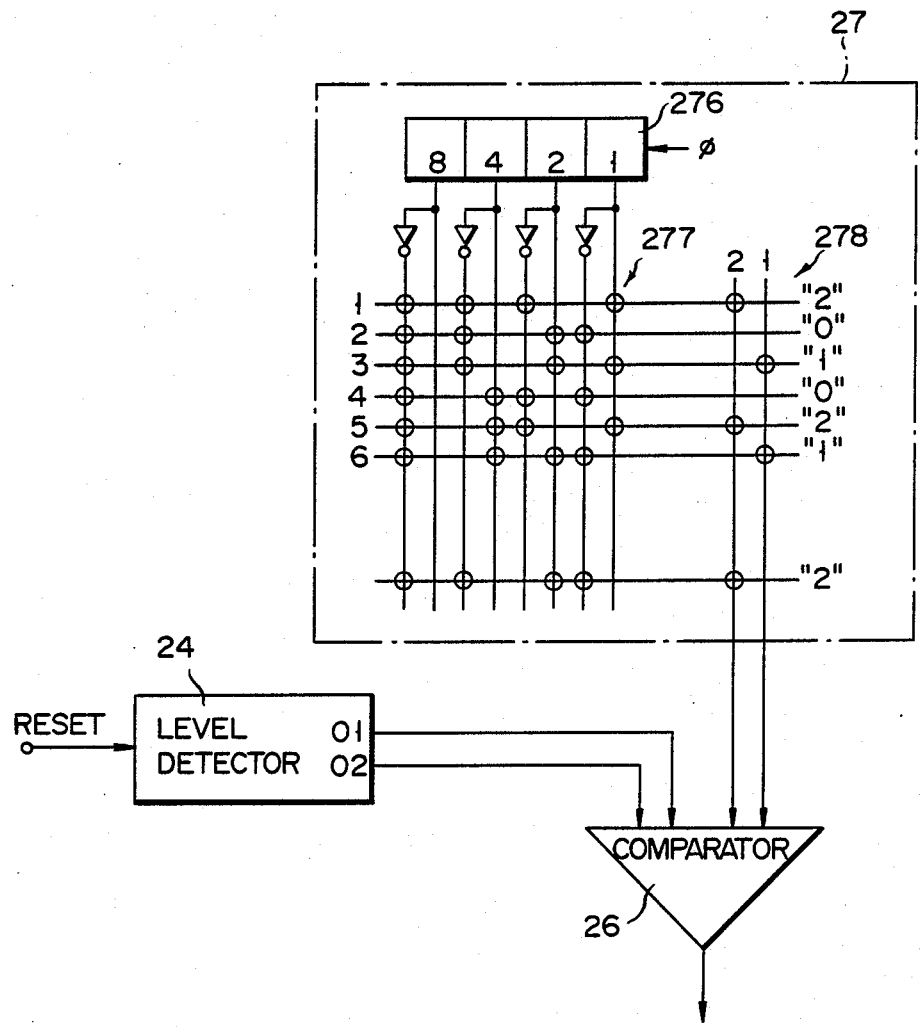
FIG. 7 is a detailed block diagram of a check circuit in the IC card of FIG. 6.

Check circuit 221 will be described in detail with reference to FIG. 7. Level detector 24 has output terminals 01 and 02 and outputs "00" for level information "0", "01" for "1", and "10" for "2".

Level matrix 27 comprises counter 276 for counting pulses of clock signal $\phi$, matrix section 277 for selectively generating read addresses 1 to 10 according to the content of counter 276, and memory 278 for outputting level information "0", "1", or "2" in response to the address data from matrix section 277. In this case, level information "0" is output as code data "00"; "1", as "01"; and "2", as "10".

An output from memory 278 is supplied to comparator 26.

The operation of the above embodiment having the arrangement described above will be described with reference to a flow chart in FIG. 5.

The user inserts IC card 1 into test terminal 2. The I/O, RESET, CLOCK, Vcc, Vpp, and GND terminals of card 1 are connected to the corresponding terminals of terminal 2.

Step A1 is executed. In step A1, the main controller determines whether a legal test program starting request is generated. Analog signals having different levels are supplied from terminal 2 to the RESET terminal of IC card 1. More particularly, voltages Vcc, V1, and V2 having different levels are serially input to the RESET terminal in synchronism with clock signal $\phi$, as shown in FIG. 8. In this case, 10 three-value signals are input to the RESET terminal in an order of V2, Vcc, V1, Vcc, ... V2. The pieces of serial level information which correspond to these three-value signals sequentially appear at output terminals 01 and 02 of level detector 24 and are supplied to comparator 26.

In level matrix 27, pulses of clock signal $\phi$ from terminal 2 are counted by counter 276. Matrix section 277 outputs read addresses 1 to 10 according to the contents of the count from counter 276. The pieces of serial level information stored at addresses 1 to 10 of memory 278 are sequentially read out therefrom. In this case, the pieces of information are read out from memory 278 in an order of "2", "0", "1", ... "2". The outputs of memory 278 are supplied to comparator 26.

Comparator 26 checks coincidences between the pieces of level information from level detector 24 and the pieces of level information from matrix 27. If a coincidence is established, comparator 26 generates a logic "1" output. However, if a combination of three-value signals from the terminal does not coincide with the corresponding one stored in memory 278 due to an illegal program starting request, the output from comparator 26 is kept at logic "0" as a noncoincidence.

In this state, the output from comparator 26 is sent to main controller 17.

In this case, if the three-value signals shown in FIG. 8 are serially input to the RESET terminal, comparator 26 generates a coincidence signal and its output is set at logic "1". In this case, the main controller 17 determines that the request is a legal request, and the flow advances to step A2.

In step A2, main controller 17 sends to terminal 2 an instruction that the program starting request from IC card 1 is received as a legal one by terminal 2. In practice, this instruction is sent to decryption/comparison circuit 19.

A specific code written in system program ROM 15 is read out in response to an instruction from main controller 17. This specific code is sent to decryption/comparison circuit 19. In step A3, the specific code from terminal 2 is compared with the specific code of the card itself. If a comparison result represents a noncoincidence, the flow advances to step A5 wherein card invalidation processing is performed. Card invalidation inhibits addressing and data read/write access of data memory 21 in response to an instruction from main controller 17. However, if the comparison esult represents a coincidence, the flow advances to step A4. The contents of test program ROM 16 are read out to cause terminal 2 to check the bit pattern of system program ROM 15 in card 1 or to access data memory 21.

If the combination of the three-value signals from terminal 2 does not coincide with the prestored one due to an illegal program starting request, comparator 26 generates a logic "0" signal as a noncoincidence signal, and the flow advances to step A5. In the same manner as described above, addressing and data read/write access of data memory 21 under the control of data memory controller 18 are prohibited, and card invalidation processing is performed.

With the above arrangement and operation, the three-value signals are serially supplied from the terminal 2 to the RESET terminal of the IC card 1. In this case, only if the combination of pieces of serial level information on the basis of the three-value signals coincides with the combination of pieces of serial level information prestored in the card, the test program in the card can be initialized. Unlike in the conventional arrangement in which the test terminal is used to externally initialize the test program, an attempt for extracting highly confidential information can be prevented.

According to the second embodiment described above, only one terminal of the IC card such as Reset terminal is utilized to serially input multivalue signals thereto, thereby start the test program. However, a plurality of terminals may be used, and serial multivalue signals may be input as parallel inputs to the plurality of terminals to initialize the test program, as will be described in detail in the following third embodiment.

In this embodiment, the I/O and RESET terminals are utilized to perform a test program starting request.

Figure 9:
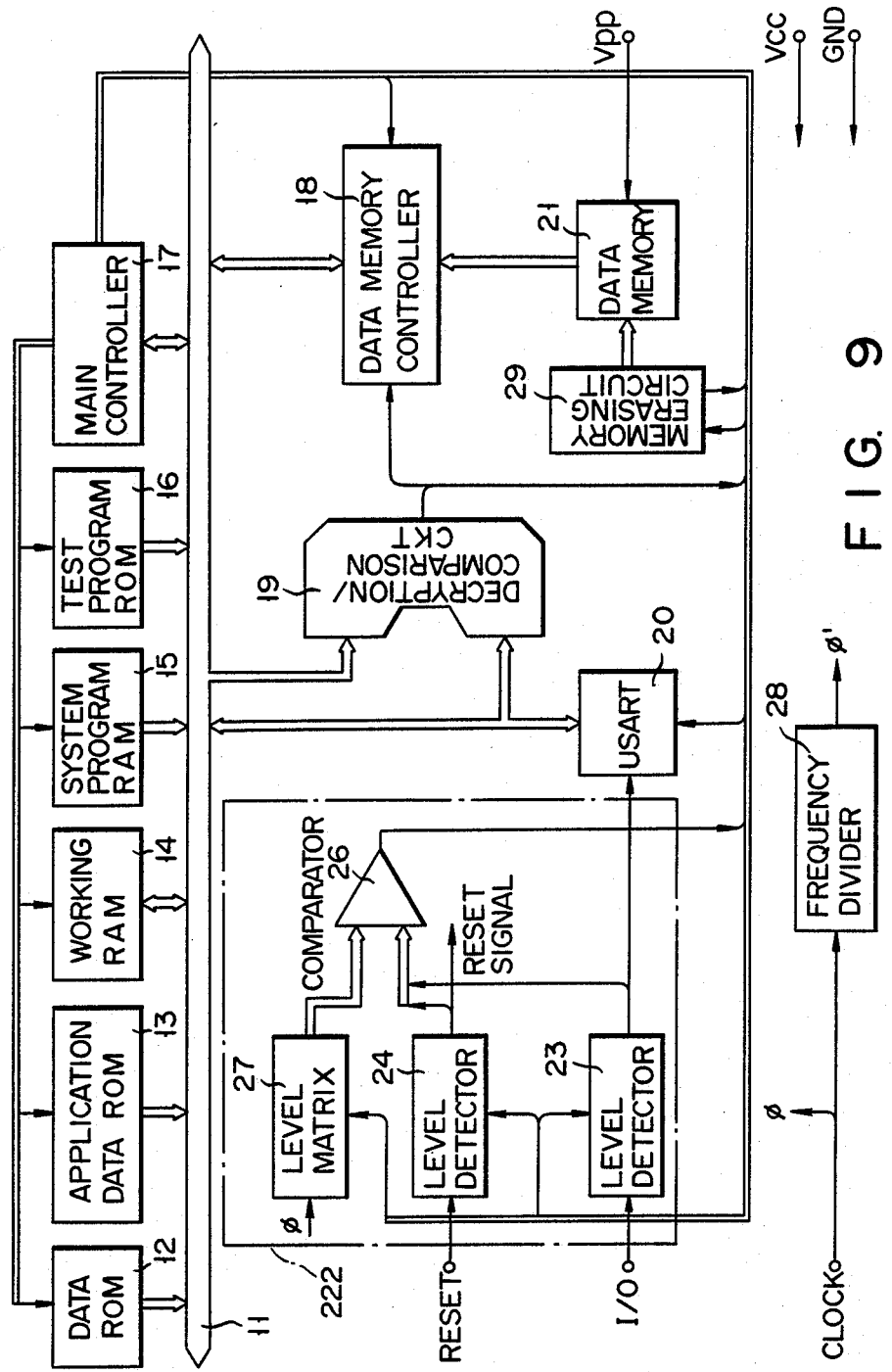
FIG. 9 is a block diagram of an IC card according to a third embodiment of the present invention.

FIG. 9 shows a circuit arrangement of this embodiment. The same reference numerals as in the first embodiment denote the same parts in the third embodiment, and a detailed description thereof will be omitted.

Figure 11:
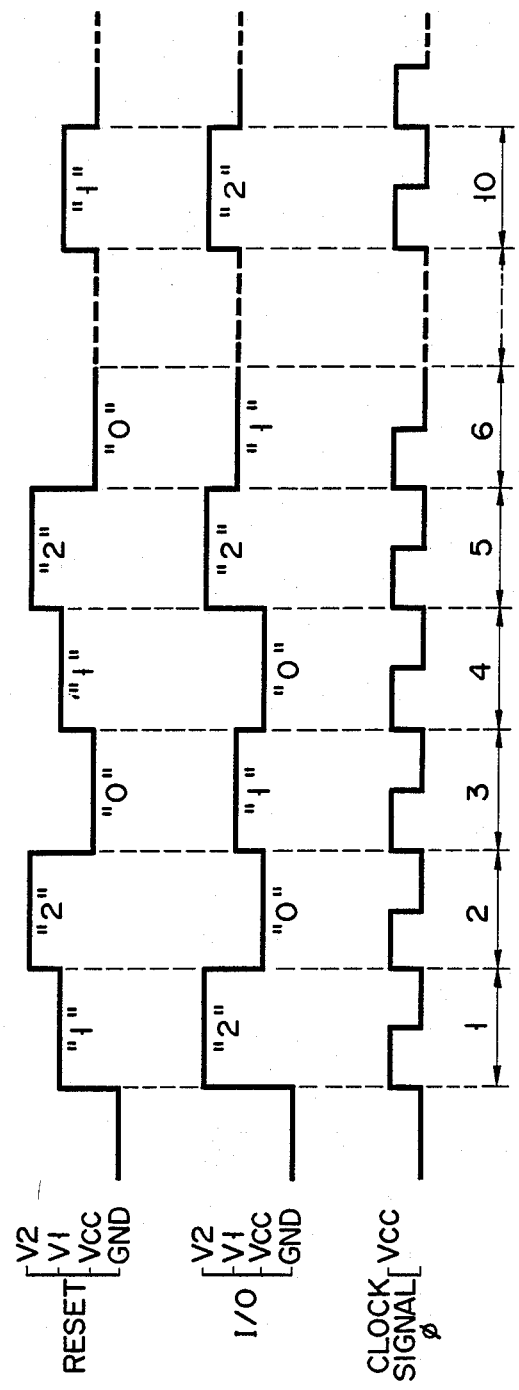
FIG. 11 is a timing chart for explaining a three-value signal used in the IC card of FIG. 9.

Reference numeral 222 denotes a check circuit for checking whether a legal test program starting request is sent from the card 1 to the terminal 2. Check circuit 222 has an I/O terminal for exchanging data with terminal 2 and a RESET terminal for receiving a reset signal while card 1 is loaded in terminal 2. Level detectors 23 and 24 are respectively connected to the I/O and RESET terminals, respectively. In this case, in addition to the reset signal, a plurality of analog signals having different levels are serially input to the I/O and RESET terminals in synchronism with clock signal $\phi$. More specifically, multivalue signals having different signals are voltages Vcc, V1, and V2, respectively, as shown in FIG. 11. The voltages Vcc, V1, and V2 are supplied to the I/O and RESET terminals in a predetermined order in synchronism with clock signal $\phi$. In this state, level information "0" for Vcc, "1" for V1, and "2" for V2 are obtained in correspondence with the three-value signals from level detectors 23 and 24.

The outputs from level detectors 23 and 24 are supplied to comparator 26. An output from level matrix 27 is supplied to comparator 26. Matrix 27 stores level information inherent to each card so as to correspond to the level information from level detectors 23 and 24. Matrix 27 receives clock signal $\phi$.

A comparison result from comparator 26 is supplied to main controller 17.

Figure 10:
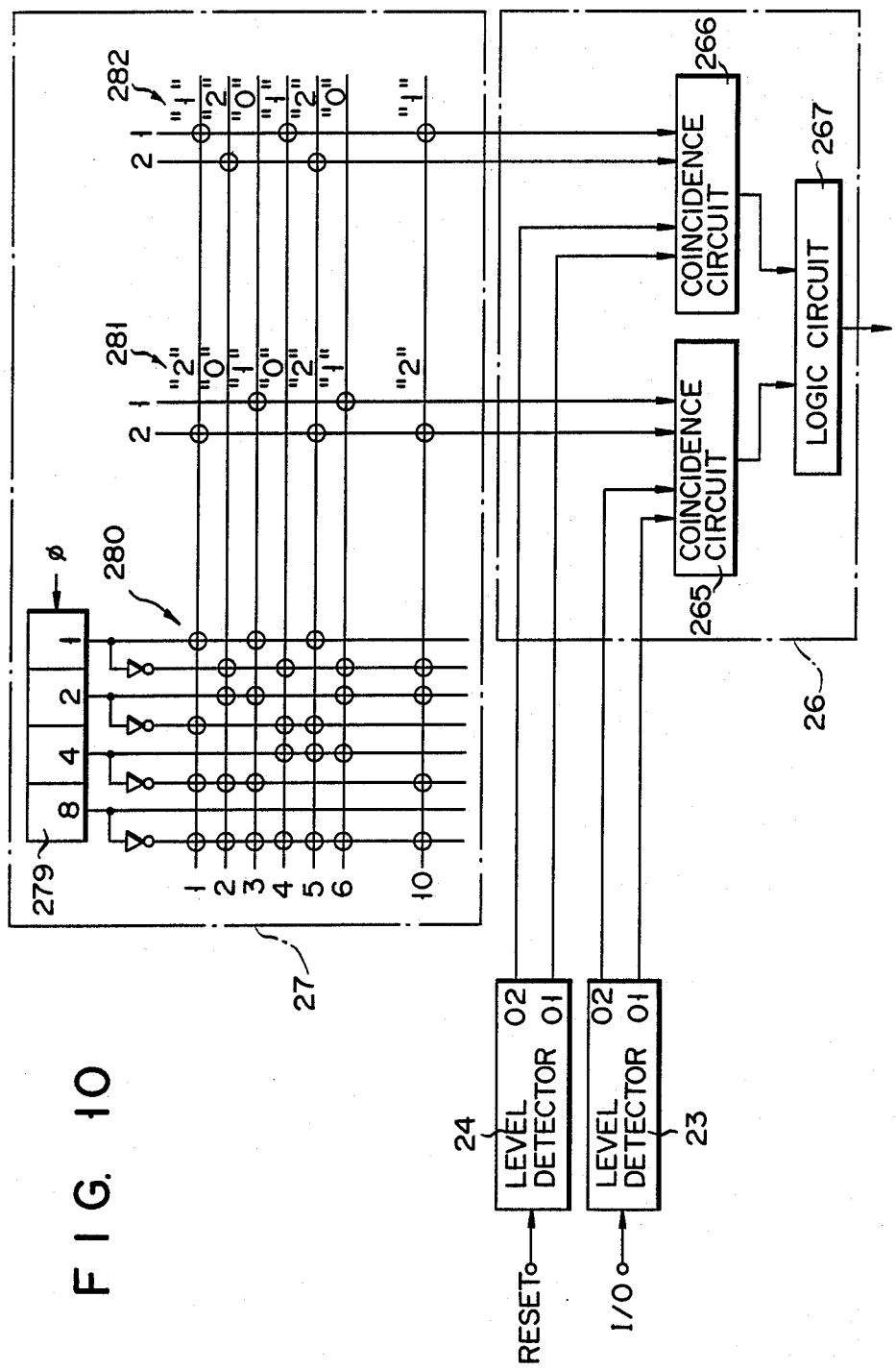
FIG. 10 is a detailed block diagram of a check circuit in the IC card of FIG. 9.

Check circuit 222 will be described in detail with reference to FIG. 10. Each of level detectors 23 and 24 has terminals 01 and 02 and outputs bit data "00" for level information "0"; "01" for "1"; and "10" for "2". Comparator 26 for receiving outputs from detectors 23 and 24 comprises two coincidence circuits 265 and 266 for respectively receiving the outputs from detectors 23 and 24, and logic circuit 267. When coincidence signals are simultaneously output from coincidence circuits 265 and 266, logic circuit 267 generates a logic "1" output.

Level matrix 27 comprises counter 279 for counting pulses of clock signal $\phi$, matrix section 280 for outputting read addresses 1 to 10 according to the contents of a count from counter 279, and memories 281 and 282 for generating the prestored level information "0", "1", or "2" in response to an address designated by matrix section 280. In this case, level information "0" is output as "00"; "1", as "01"; and "2", as "10".

An output from memory 281 is supplied to coincidence circuit 265, and an output from memory 282 is supplied to coincidence circuit 267.

An output from check circuit 222 in FIG. 9 in response to the comparison result from comparator 26 is supplied to memory erasing circuit 29. If the comparison result in comparator 26 represents a legal program starting request, memory erasing circuit 29 receives the check circuit output as a memory erasing start signal and supplies, e.g., a chip erasing instruction to data memory 21, thereby erasing all contents of data memory 21. Upon completion of erasure of data memory 21, a memory erasing end signal is sent to main controller 17 from circuit 29.

Figure 12:
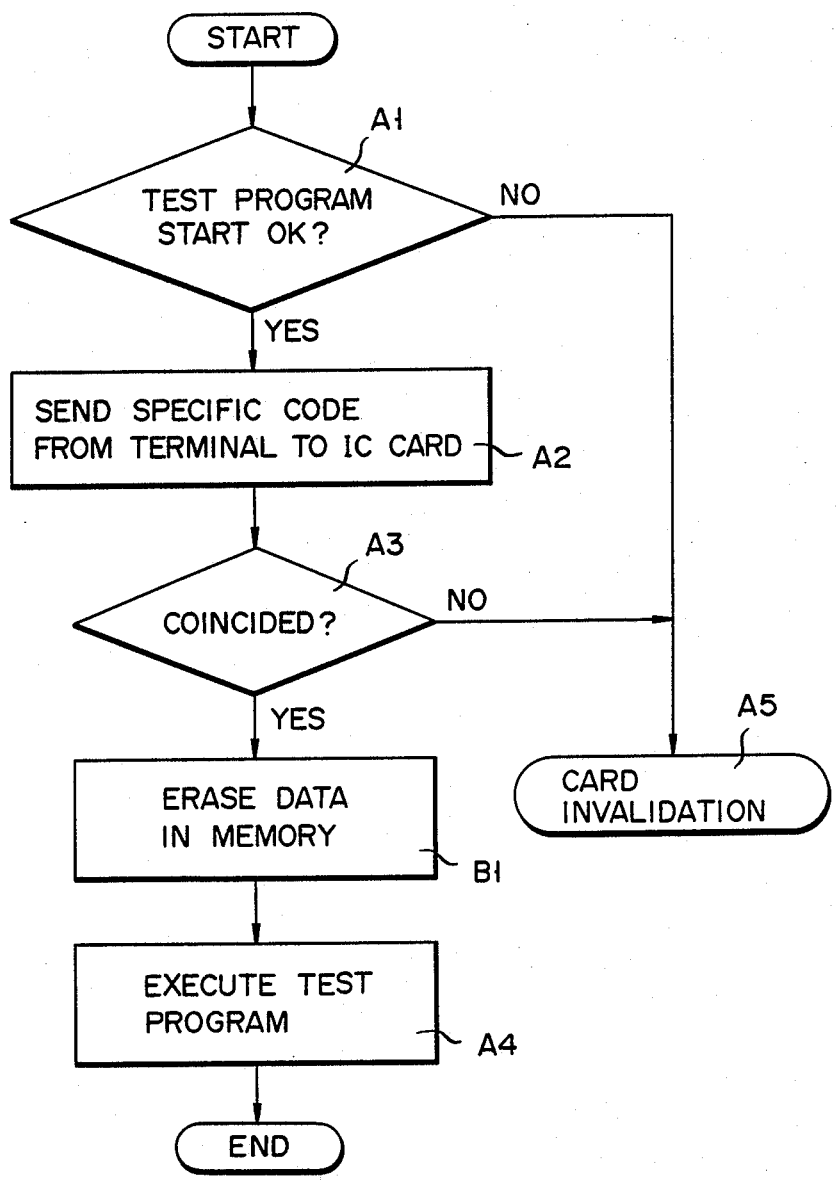
FIG. 12 is a flow chart for explaining the operation of the IC card in FIG. 9.

The operation of the above embodiment will be described with reference to a flow chart in FIG. 12. The same reference numerals as in the flow chart of FIG. 5 denote the same steps in FIG. 12.

The user inserts IC card 1 into test terminal 2. The I/O, RESET, CLOCK, Vcc, Vpp, and GND terminals of card 1 are connected to the corresponding terminals in terminal 2.

Step A1 is then executed. In step A1, main controller 17 determines whether a legal test program starting request is generated. Different multivalue signals are supplied from terminal 2 to the I/O and RESET terminals. More specifically, as shown in FIG. 11, two parallel sets of serial voltages Vcc, V1, and V2 having different levels are respectively supplied to the I/O and RESET terminals in response to a test instruction from the terminal 2. In this case, 10 three-value signals are supplied to the I/O terminal in an order of V2, Vcc, V1, Vcc, ... V2 shown in FIG. 11. The pieces of serial level information corresponding to these three-value signals sequentially appear at output terminals of level detectors 23 and 24 and supplied to coincidence circuits 265 and 266 in comparator 26.

In level matrix 27, counter 279 counts pulses of clock signal from terminal 2. Matrix 280 outputs read addresses 1 to 10 in response to the contents of the counts from counter 279. The pieces of serial level information stored at addresses 1 to 10 in memories 281 and 282 are sequentially read out. In this case, the pieces of information are read out from memory 281 in an order of "2", "0", "1", ... "2", and the pieces of information are read out from memory 282 in an order of "1", "2", "0", ... "1". These outputs are supplied to coincidence circuits 265 and 266 in comparator 26.

Coincidence circuits 265 and 266 check coincidences between the pieces of level information from level detectors 23 and 24 and those from matrix 27. If coincidences are established, logic circuit 267 generates a logic "1" output. However, if the combination of three-value signals from the terminal differs from that of signals stored in memories 281 and 282 due to an illegal test program starting request, the output from logic circuit 267 is kept at logic "0".

The output from logic circuit 267 is sent to main controller 17.

In this case, when the three-value signals shown in FIG. 11 are input to the I/O and RESET terminals, both coincidence circuits 265 and 266 generate logic "1" outputs as coincidence signals. The main controller 17 determines that the current request is a legal test program starting request, and the flow advances to step A2.

In step A2, main controller 17 sends to terminal 2 an instruction that the request is a legal request. In this state, a specific code is sent from terminal 2 to IC card 1 to start the test program. This specific code is supplied to decryption/comparison circuit 19 in practice.

A specific code written in system program ROM 15 is read out in response to a read instruction from main controller 17 and is supplied to decryption/comparison circuit 19. In step A3, the specific code from terminal 2 is compared with that of the card itself. If a comparison result represents a noncoincidence, the flow advances to step A5, and card invalidation processing is performed. In this case, card invalidation inhibits addressing and data read/write access of data memory 21 under the control of data memory controller 18, in response to an instruction from main controller 17. However, if the comparison result represents a coincidence between the specific codes of terminal 2 and card 1, the flow advances to step B1.

In step B1, since the comparison result (step A1) from comparator 26 represents a coincidence corresponding to the legal test program starting request, the result is stored as an erasing start signal in memory erasing circuit 29. A chip erase instruction is supplied from erasing circuit 29 to data memory 21, and all the contents of memory 21 are completely erased. Upon completion of the erasure, a memory erasing end signal is sent to main controller 17. In this state, the flow advances to step A4. The contents of test program ROM 16 are read out from an instruction from controller 17 to check the bit pattern of system program ROM 15, and allow access of data memory 21.

However, if main controller 17 determines that the combination of three-value signals differs from the legal one due to an illegal test program starting request, a noncoincidence signal is generated by one of coincidence circuits 265 and 266. The output from logic circuit 267 is held at logic "0", and controller 17 determines that the current request is an illegal request. In this case, the flow advances to step A5. In the same manner as described above, addressing and data read/write access of data memory 21 under the control of data memory controller 18 are interrupted, and the card is determined to ee invalid.

As is apparent from the above description, the I/O and RESET terminals of IC card 1 are utilized, and two parallel sets of serial three-value signals are respectively supplied thereto. If the combinations of parallel sets coincide with those read from the memories, respectively, the test program in the card is started. Unlike the conventional case wherein a test terminal is utilized to externally execute the test program, illegal starting of the test program can be prevented. An attempt for externally extracting highly confidential information can be prevented.

Furthermore, when the test program starting request is supplied to IC card 1, all the contents of the data memory can be erased prior to the test mode. Even if confidentiality of the card contents is not completely assured, the contents of the data memory 21 are not read out at all. Thus, even if the test program in the IC card 1 is illegally started, safety of the card 1 can be satisfactorily assured. In addition, since any attempt for externlly extracting highly confidential information can be prevented, technical analysis of the entire system, let alone counterfeit of the card, can be completely prevented to improve the safety level of the entire card system.

In the first to third embodiments of the present invention, the tree-value signals are used to start the test program. However, binary signals or signals having four or more values may be used. In addition, analog signals may be used, and the number and type of terminals are not limited to the ones described above.

The first to third embodiments are concentrated on descritpion of start of the test program. Execution of the test program will be described with reference to the following fourth embodiment.

FIG. 13 shows a circuit arrangement of IC card 7. Referring to FIG. 13, reference numeral 71 denotes a system bus connected to answer-to-reset data ROM 72, application ROM 73, test program ROM 74, system program ROM 75, working RAM 76 having an ED register 76a, central controller 77, data memory read/write controller 78, decryptor 79, input controller 81 through input buffer 80, and output controller 83 through output buffer 82. Controllers 81 and 83 are conneced to data input/output terminal I/O.

Answer-to-reset data ROM 72 stores all conditions (e.g., data write application voltage and current, a maximum application voltage, a maximum data transmission amount, and a maximum response wait time) required for IC card 7. These condition data signals are sent as answer-to-reset data to terminal 2 in FIG. 4 according to a predetermined format upon completion of the internal initialization of the card itself.

Application ROM 73 stores "APN" data representing the type of IC card 7. This data is sent to terminal 2 in a predetermined format when attributes are exchanged between terminal 2 and card 7 after initial parameters are set on the basis of the answer-to-reset data.

Test program ROM 74 stores programs for various card tests.

System program ROM 75 stores the "ACK" or "NAC" code signal representing whether a signal sent togethr with various system programs from terminal 2 is correct. ROM 75 also stores data (N+1) used for a write test for memory 84.

Figure 14:
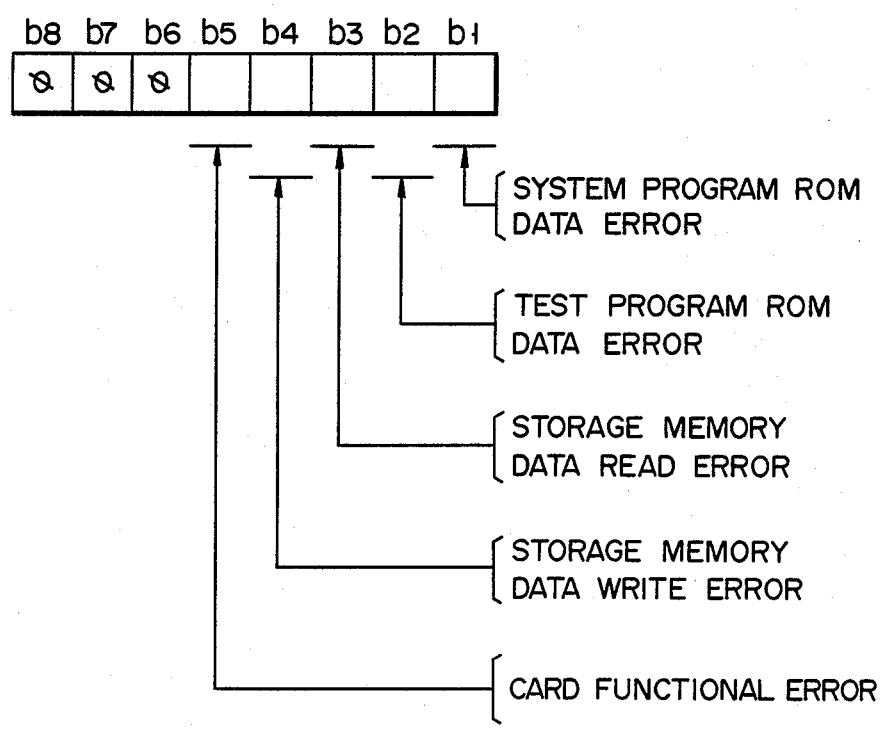
FIG. 14 is a data format of error data (ED) stored in a working RAM in the IC card of FIG. 13.

Working RAM 76 stores various types of processed data in card 7. As shown in FIG. 14, the register 76a provided in RAM 76 stores error data ED consisting of an 8-bit code. Bit b1 of error data ED represents a data error in system program ROM 75, bit b2 represents a data error in test program ROM 74, bit b3 represents a data read error in data memory 84, bit b4 represents a data write error in data memory 84, bit b5 represents a card functional error, and bits 6 to 8 are nonassigned bits.

Central controller 77 outputs operating instructions to the respective circuits according to an operating state a data reception signal sent through input buffer 80.

Data memory read/write controller 78 controls data read/write access of data memory 84 in response to an instruction from central controller 77.

Figure 15:
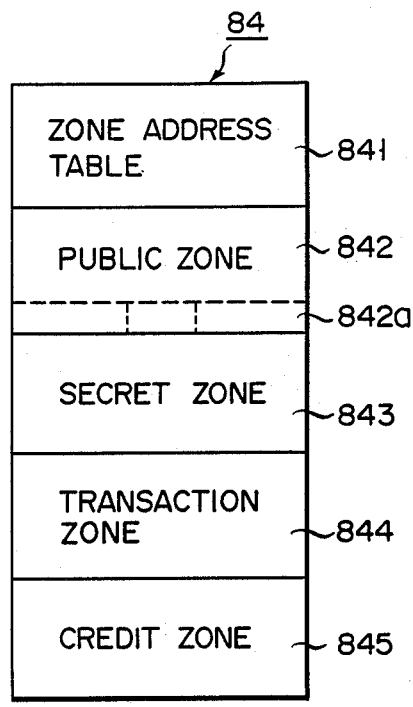
FIG. 15 is a memory map showing an internal area of a data memory used in the IC card of FIG. 13.
Figure 16:
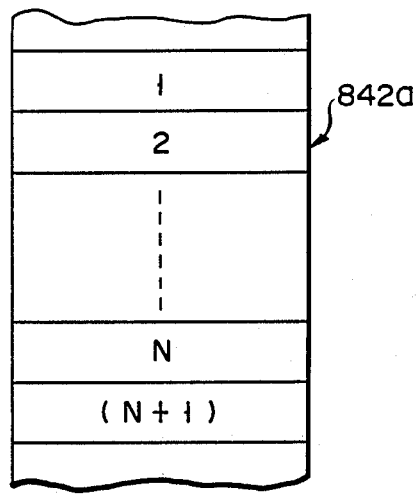
FIG. 16 is a memory map for explaining test areas in the data memory, in the IC card of FIG. 13.

As shown in FIG. 15, data memory 84 comprises zone address table 841, public zone 842, secret zone 843, transaction zone 844, and credit zone 845. Table 841 stores address data of a predetermined zone as test data used for, e.g., card verification or authentication. Verification data is read out from the predetermined zone in response to the address data. The data from the predetermined zone is compared with the test data to verify the card. Public zone 842 has test area 842a for executing a write/read test of memory 84. Area 842a stores data signals "1", "2", ... "N" for performing a read test, as shown in FIG. 16. (N+1) areas in test area 842a are used for a write test. Zone 843 stores the "PIN" (Personal Identification Number) code, the "RTN" (Re-Try Number) code representing the number of re-try inputs, the "IPIN" (Initialization Personal Identification Number) representing the number before the "PIN" is used, the PAN (Primary Account Number) code representing a bank account or the like, and the "PRK" (PRivate Key) code representing a decryption code. Zone 844 stores various types of data associated with cash transactions. Zone 845 stores data associated with credit transactions.

Referring back to FIG. 13, decryptor 79 decrypts the code on the basis of a predetermined algorithm. Decryptor 79 uses the "PRK" code from data memory 84 to decrypt input data supplied from terminal 2 through input buffer 80.

Central controller 77 is connected to timer 85. Timer 85 sets a predetermined period of time required for verifying validity/invalidity of the card. Timer 85 is set in response to an instruction from controller 77 prior to an input of the PIN code and is started upon the input of the PIN code. When the predetermined period of time has elapsed, timer 85 sends an interrupt signal to controller 77.

The contents of data memory 84 which are accessed under the control of data memory read/write controller 78 are supplied to one input terminal of comparator 86. The other input terminal of comparator 86 receives the input data decrypted by decryptor 79, the data read out from working RAM 76, and the specific code read out from data ROM 72. A comparison output from comparator 86 is sent to central controller 77.

While IC card 7 is loaded in terminal 2, reset signal RESET and system clock CLOCK are sent from terminal 2. At the same time, card 7 is also connected to the Vcc and Vpp power sources. The Vcc power source is a system drive power source, and the Vpp power source is a write power source for data memory 84. The power source voltages from the Vcc and Vpp power sources are set in terminal 2 on the basis of the answer-to-reset data stored in data ROM 72. The system operating signal from system clock CLOCK is supplied to the respective components through frequency divider 87.

The operation of the embodiment having the arrangement described above will be described with reference to a flow chart in FIGS. 17 and 18.

In order to perform a test, the user inserts IC card 7 into terminal 2. In this state, a key for designating a test mode of card 7 is operated on keyboard 4 (FIG. 4). A test start instruction is then read out from system program ROM 34 in response to an instruction from main controller 37 and is sent to card 7 through output controller 43 and output buffer 44. In card 7, the test start instruction is written in working RAM 76 through input controller 81 and input buffer 80.

Figure 17A:
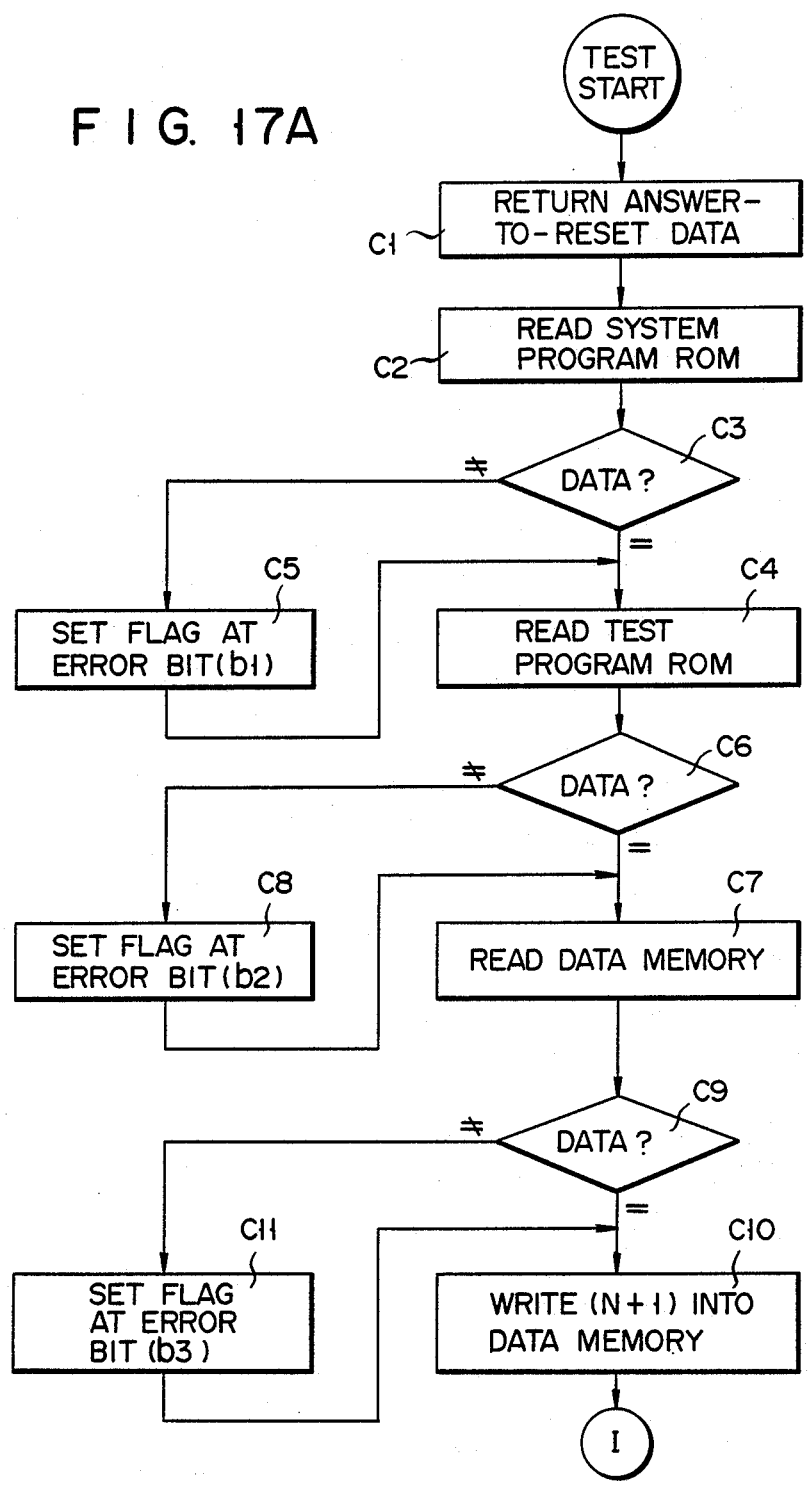
FIGS. 17A, 17B and 18 are flow charts for explaining the operation of the IC card in FIG. 13.
Figure 17B:
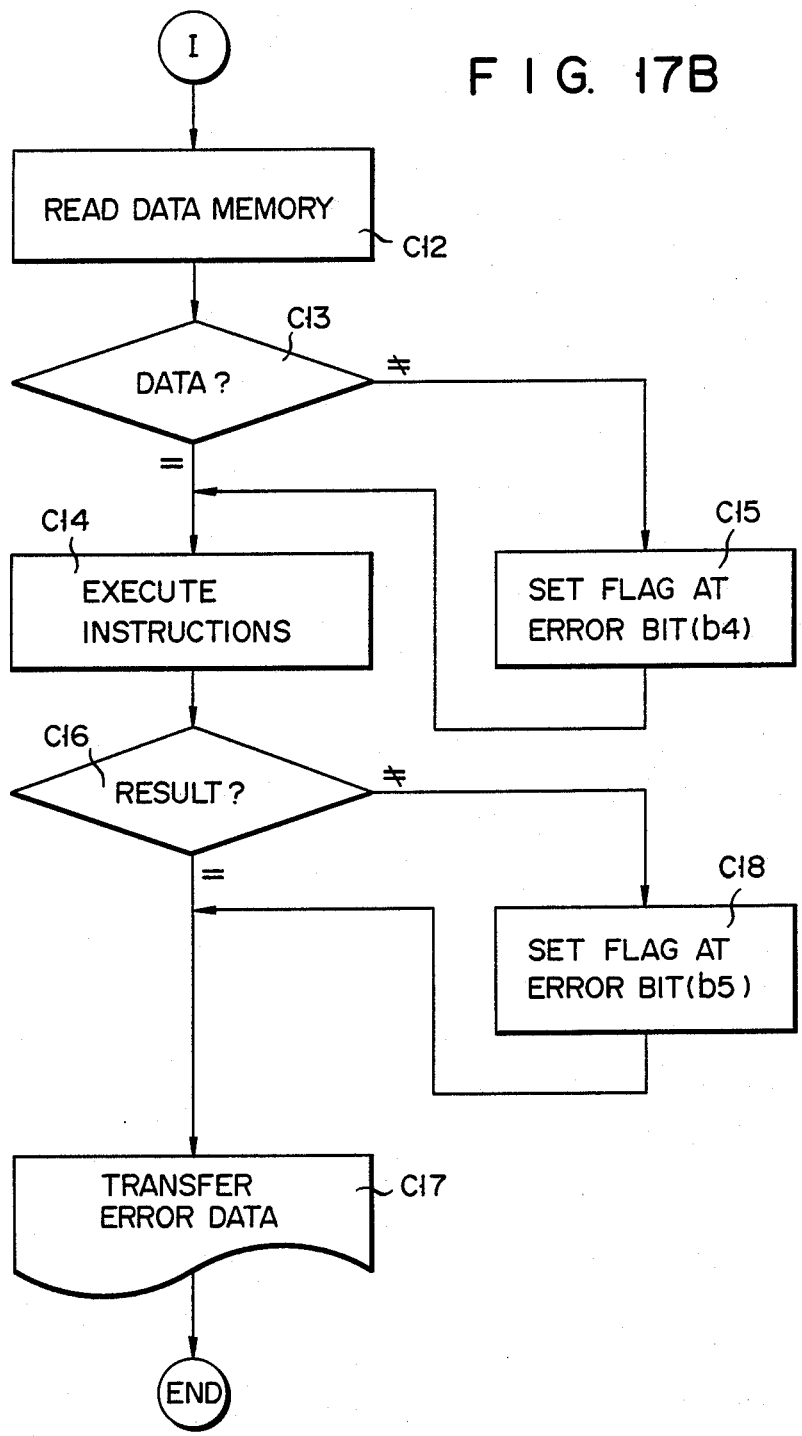
Figure 18:
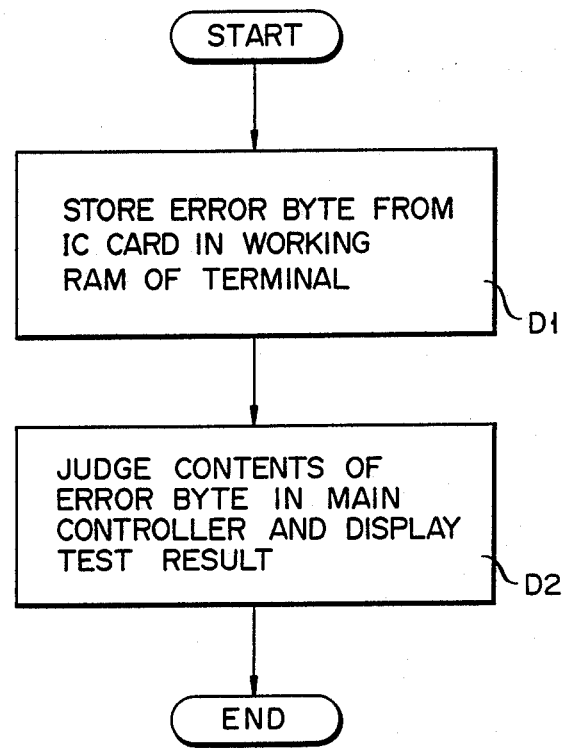

When central controller 77 determines that the current input represents the test start instruction, answer-to-reset data is read out from answer-to-reset data ROM 72 in step C1 of FIG. 17. This data is sent from the I/O terminal to terminal 2 through output buffer 82 and output controller 83. In his case, terminal 2 sets a predetermined period of time to wait sending out of the answer-to-reset data from card 7. If data is not sent within the predetermined period of time, a test start instruction is sent to the card 7 again. If the answer-to-reset data is not sent after sending of the start instruction by a plurality of times, e.g., three times, card functional error processing is performed.

As shown in step C1, when the answer-to-reset data is sent to terminal 2, IC card 7 is set in the test mode.

In step C2, data is read out from system program ROM 75 in units of bytes. The readout data signals are sequentially calculated. Central controller 77 then determines in step C3 whether the calculated data represents a predetermined value. If YES in step C3, the flow advances to step C4. However, if NO in step C3, controller 77 determines that an error is present in data from ROM 75, and the flow advances to step C5. In step C5, a flag of logic "1" is set at bit b1 of error data ED in working RAM 76. Thereafter, the flow advances to step C4.

In step C4, data is read out from test program ROM 74 in units of bytes. The readout data signals are sequentially calculated. Controller 77 then determines in step C6 whether the calculated data represents a predetermined value. If YES in step C6, the flow advances to step C7. However, if NO in step C6, controller 77 determines that an error is present in the data read out from test program ROM 74. In this case, the flow advances to step C8. In step C8, a flag of logic "1" is set at bit b2 of error data ED in working RAM 76, and then the flow advances to step C7.

In step C7, data signals are sequentially read out from test area 842a in public zone 842 in data memory 84. In this case, these data signals are read out from area 842 in an order of "1", "2", "3", ... "N". Central controller 77 determines in step C9 whether all data signals are properly read out. If YES in step C9, the flow advances to step C10. However, if NO in step C9, controller 77 determines that an error is present in the data read out from data memory 84. In this case, the flow advances to step C11. In step C11, a flag of logic "1" is set at bit b3 of error data ED in working RAM 76, and the flow advances to step C10.

In step C10, data (N+1) is read out from system program ROM 75 in response to a read instruction from central controller 77. This readout data is stored in (N+1) of test area 842 in public zone 842 in storage memory 84. In step C12, data written in the (N+1) area in test area 842a in public area 842 in data memory 84 is immediately read out. Central controller 77 determines in step C13 whether the readout data coincides with the writing data. If a coincidence is established, the flow advances to step C14. However, if NO in step C13, controller 77 determines that an error is present in data written in data memory 84. In this case, the flow advances to step C15. In step C15, a flag of logic "1" is set at bit b4 of error data ED in working RAM 76 in response to an instruction from central controller 77, and the flow advances to step C14.

In step C14, various instructions are read out from system program ROM 75 in response to a read instruction from central controller 77. The execution results of the readout instructions are determined in step C16. If the execution results are correct, the flow advances to step C17. However, if controller 77 determines that the execution results are incorrect, card functional error processing is performed in step C18. In step C18, a flag of logic "1" is set at bit b5 of error data ED in working RAM 76 in response to an instruction from central controller 77, and then the flow advances to step C17.

In step C17, error data ED is read out from working RAM 76 and sent to terminal 2 through output buffer 82 and output controller 83.

Terminal 2 receives error data ED sent from card 7 through input controller 46 and input buffer 45. In step D1 of FIG. 18, the error byte from the IC card is stored in working RAM 33, and the flow advances to step D2.

In step D2, the contents of error data ED in working RAM 33 are judged by main controller 37. The test result is sent to display drive controller 38 and displayed on display unit 3. In this case, the display contents on display unit 3 are determined according to the logical states of bits b1 to b5 of error data ED, thereby displaying each test result.

With the above arrangement, in the LSI operation tests in IC card 1, the data errors in the system and test program ROMs, the data read/write errors in the data memory 84, and functional errors based on the various instructions are stored in correspondence with the bits of error data ED and at the same time are displayed on the display unit 3. Therefore, error locations of the LSIs can be easily specified, and countermeasures against the errors can be immediately provided. Unlike the conventional IC card invalidated by a simple error, the IC card need not be invalidated, due to such a simple error.

As has been described in detail, the test program in the IC card 7 cannot be illegally started. At the same time, since secret information in the data memory 84 can be erased prior to the test, highly confidential information is not be externally extracted, and counterfeit of the card can be perfectly prevented. Moreover, the error location caused by an IC card 7 test can be easily specified, and an immediate countermeasure can provided.

What is claimed is:

1. An IC card system comprising:
   IC card means, having a plurality of terminals and including at least one integrated circuit, for exchanging signals with an external device through said plurality of terminals, said integrated circuit including test program storing means for storing a test program for performing a test of said integrated circuit, and checking means for checking truth/false of a test start signal sent from said external device and for executing the test program according to a checking result; and
   terminal means for receiving said IC card means therein to direct performing of the testing of said integrated circuit in said IC card means, said terminal means comprising test starting means for sending the test start signal to said IC card means.

2. A system according to claim 1, wherein said test starting means in said terminal means includes multivalue signal output means for generating multivalue signals having a plurality of different voltage levels, and said checking means in said IC card means includes:
   voltage detecting means for detecting the voltage levels of the multivalue signals sent from said multivalue signal output means;
   unique code storing means for storing a unique code; and
   comparing means for comparing a detection result from said voltage detecting means with the unique code read out from said unique code storing means to determine whether the detection result coincides with the unique code.

3. A system according to claim 2, wherein
   said multivalue signal output means in said terminal means sends a plurality of parallel test start signals to said IC card means through predetermined ones of said plurality of terminals,
   said voltage detecting means in said checking means includes a plurality of voltage detectors for detecting voltage levels of the test start signals sent from said terminal means, said unique code storing means stores a plurality of unique codes, and said comparing means parallel-compares outputs from said plurality of voltage detectors with the plurality of unique codes from said unique code storing means.

4. A system according to claim 3, wherein said checking means further comprises first counting means for counting pulses of a clock signal sent from said terminal means, said comparing means being enabled when a content of a count of said first counting means reaches a predetermined value.

5. A system according to claim 3, wherein said unique code storing means comprises a read-only memory, and said voltage detectors generate digital signals corresponding to input voltage levels, respectively.

6. A system according to claim 3, wherein said terminal means sends the multivalue signals through reset, I/O and clock terminals of said plurality of terminals of said IC card means, said multivalue signal being a signal including three different voltage levels.

7. A system according to claim 2, wherein said multivalue signal output means in said terminal means sends a set of serial test start signals to said IC card means through one of said plurality of terminals, said voltage detecting means in said checking means includes one voltage detector for detecting voltage levels of the test start signals sent from said terminal means, said unique code storing means stores a plurality of unique codes, and said comparing means serially compares detection outputs from said voltage detector with the plurality of unique codes from said unique code storing means to determine whether the detection outputs coincide with the plurality of unique codes.

8. A system according to claim 7, wherein said unique code storing means comprises a first memory including a read-only memory, and means for serially reading out storage contents of said first memory, and said voltage detector generates a digital signal corresponding to an input voltage level every time the test start signal is sent from said terminal means.

9. A system according to claim 8, wherein said serially reading out means includes second counting means, the storage contents of said first memory being serially output in response to a content of a count of said second counting means.

10. A system according to claim 7, wherein said terminal means sends the multivalue signals through a reset terminal of said plurality of terminals, said multivalue signal being a signal including three different voltage levels.

11. A system according to claim 2, wherein said multivalue signal output means in said terminal means parallel-outputs a plurality of serial test start signals to said IC card means through predetermined ones of said plurality of terminals, said voltage detecting means in said checking means includes a plurality of voltage detectors for detecting voltage levels of the plurality of serial test start signals sent from said terminal means, said unique code storing means stores a plurality of sets of unit codes and outputs serial unique codes in units of sets, and said comparing means compares detection outputs from said plurality of detectors with the plurality of sets of unique codes so as to determine whether the detection outputs coincide with the plurality of sets of unique codes.

12. A system according to claim 11, wherein said unique code storing means includes a second memory including a read-only memory, and means for serially reading out storage contents of said second memory in units of sets of storage contents, and said voltage detectors respectively generate digital signals corresponding to input voltage levels every time the test start signal is sent from said terminal means.

13. A system according to claim 12, wherein said serially reading out means includes third counting means, the storage contents of said second memory being serially read out in response to a count content of said count means in units of sets of storage contents.

14. A system according to claim 2, wherein said IC card means further comprises:

memory means for storing secret information; and means for erasing contents of said memory means when said comparing means detects a coincidence, the contents of said memory means being erased prior to an execution of said test program.

15. A system according to claim 2, wherein said IC card means further comprises:

means for executing a test on the basis of the test program sored in said test program storing means; and means for storing a result of the test performed by said test executing means.

16. A system according to claim 15, wherein said terminal means further comprises means for receiving the test result from said storing means for storing the test result and displaying the test result.

* * * * *